United States Patent [19]
Gerrand et al.

[11] Patent Number: 5,864,188
[45] Date of Patent: Jan. 26, 1999

[54] WIPER DRIVE UNIT WITH A CLOSURE PLATE CARRYING ELECTRICAL CONNECTING STRIPS

[75] Inventors: Dominique Gerrand, Thure; Bruno Moreau, Chatellerault, both of France

[73] Assignee: Valeo Systemes d'Essuyage, La Verriere, France

[21] Appl. No.: 889,284

[22] Filed: Jul. 8, 1997

[30] Foreign Application Priority Data

Jul. 8, 1996 [FR] France ................................ 96 08469

[51] Int. Cl.⁶ ........................................................ H02K 5/22
[52] U.S. Cl. ............................................ 310/71; 310/89
[58] Field of Search ............................ 310/40 MM, 42, 310/71, 89, 83

[56] References Cited

U.S. PATENT DOCUMENTS

| | | |
|---|---|---|
| 5,218,255 | 6/1993 | Horiguchi ................................ 310/71 |
| 5,309,053 | 5/1994 | Ade ........................................... 310/71 |
| 5,723,924 | 3/1998 | Blanchet .................................. 310/85 |

FOREIGN PATENT DOCUMENTS 2 720 704  12/1995  France .

OTHER PUBLICATIONS

French Search Report dated 11 Apr. 1997.

*Primary Examiner*—Nestor Ramirez
*Assistant Examiner*—Judson H. Jones
*Attorney, Agent, or Firm*—Morgan & Finnegan, LLP

[57] ABSTRACT

A drive unit for a motor vehicle screen wiper comprises a motor, a reduction gearbox and an electrical connector. The gearbox has a gearbox body, on which a closure plate is fastened. Electrically conductive strips are associated with the closure plate and make the electrical connections between the motor, the gearbox and the connector. The drive unit has a cover fixed on one face of the closure plate, with the connecting strips being interposed between this face and the cover, the closure plate and the cover defining between them a closed housing containing the connecting strips.

18 Claims, 4 Drawing Sheets

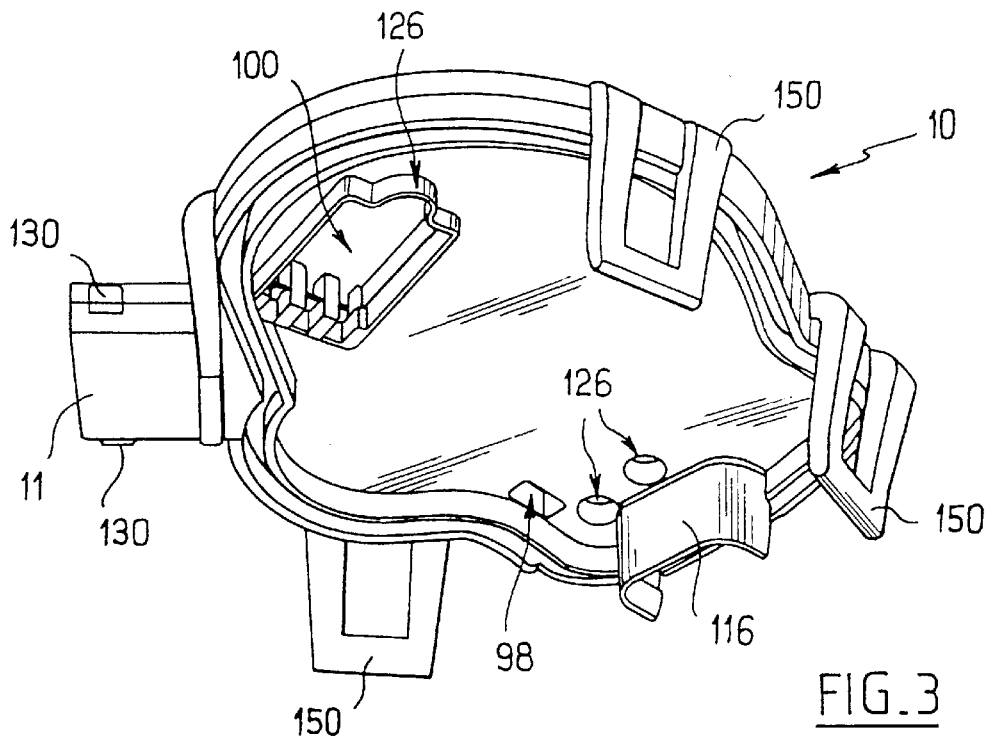
FIG_3
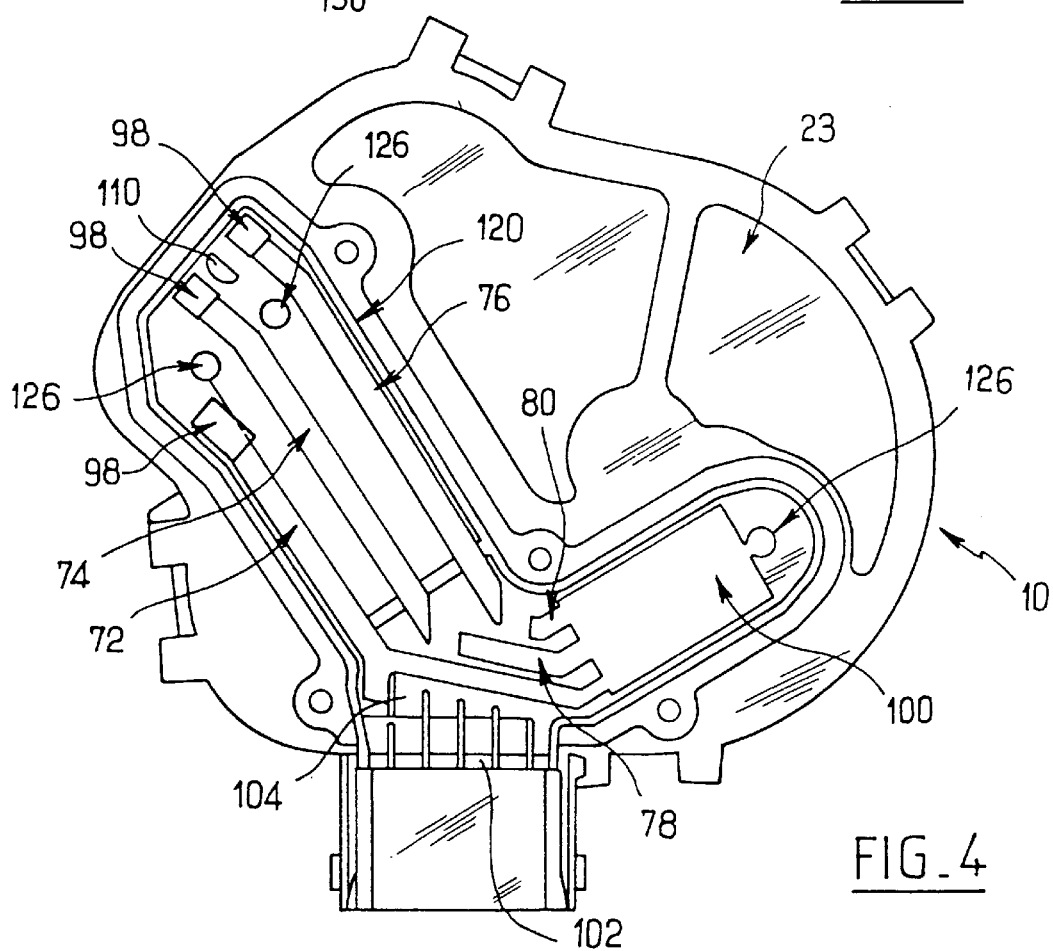
FIG_4

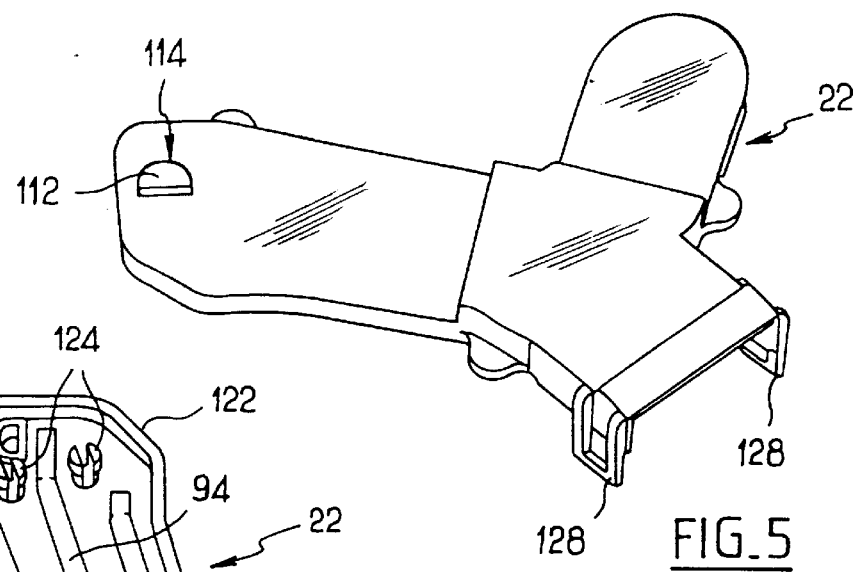
FIG_5
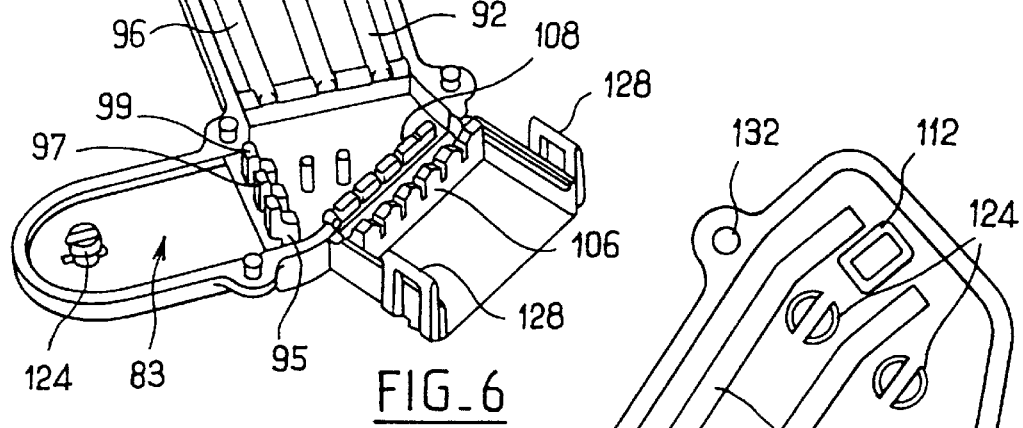
FIG_6
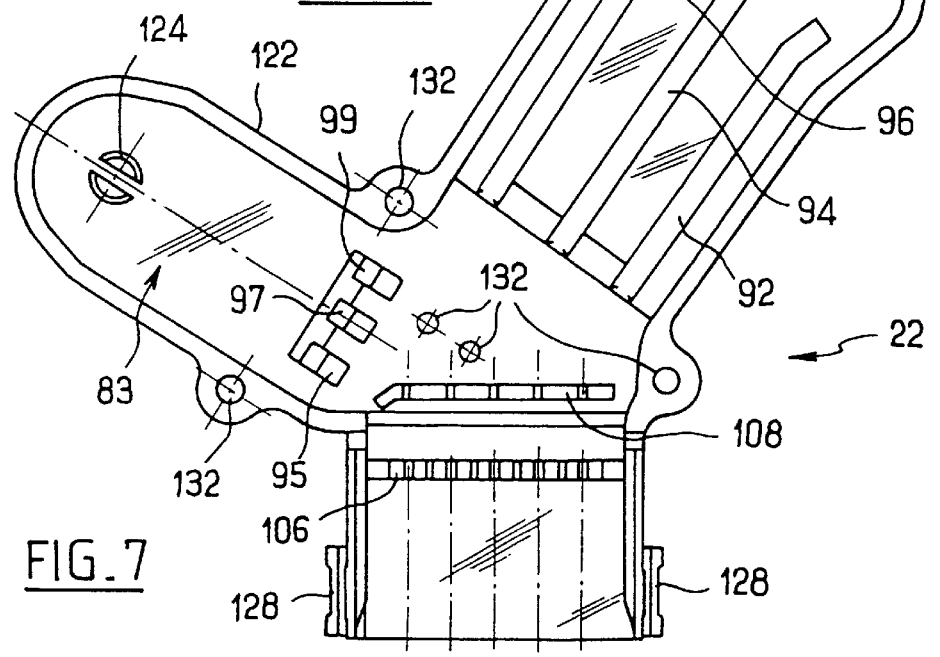
FIG_7

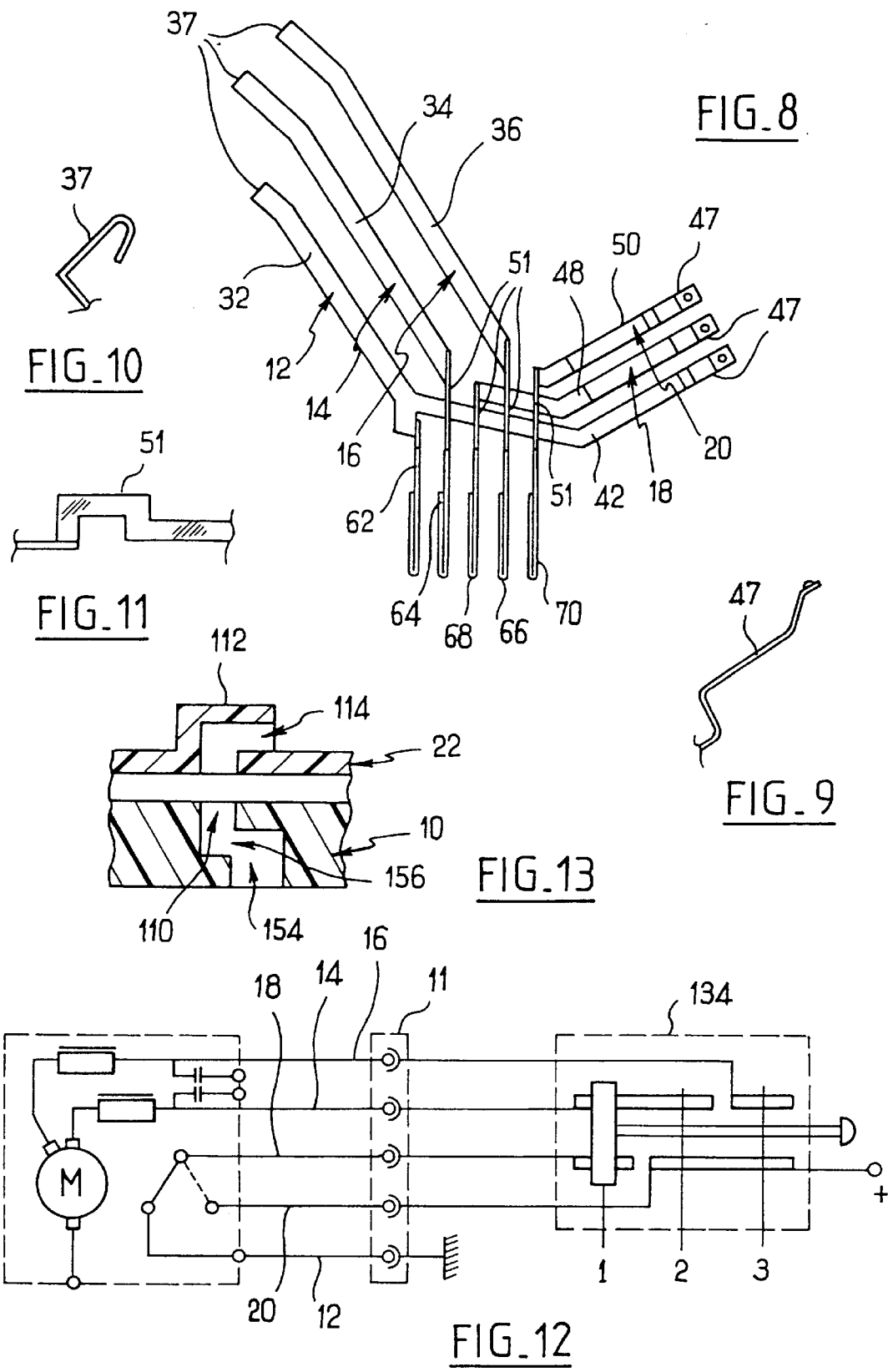

WIPER DRIVE UNIT WITH A CLOSURE PLATE CARRYING ELECTRICAL CONNECTING STRIPS

FIELD OF THE INVENTION

This invention relates to drive units for motor-vehicle screen wipers.

BACKGROUND OF THE INVENTION

It is known from U.S. Pat. No. 5,218,255 to provide a drive unit for a motor vehicle screen wiper, the drive unit comprising a motor, a reduction gearbox having a gearbox body, and a closure plate which is fastened to the gearbox body. This closure plate includes a portion which constitutes an electrical connector, for example in the form of a socket, for receiving the associated wiring of the vehicle (i.e. for receiving a connecting element such as a plug), for the power supply of the wiper drive unit and for supplying control signals to the drive unit. The closure plate includes metallic electrical connecting strips, on which the material (generally a plastics material) of the closure plate is moulded.

The strips are therefore encapsulated in this material, with the ends of the connecting strips projecting from the closure plate. Some of these ends are formed as wiping contacts for making electrical contact with a movable electric contact member of the gearbox, while others are adapted to constitute connecting terminals for the motor, or connecting pins located within the connector. In this way the connecting strips make the electrical connections between the motor, the gearbox and the connector.

Moulding of the material of the closure plate over the connecting strips gives good insulation of the middle part of the connecting strips as regards corrosion and short circuits. However, the moulding, or encapsulating, operation is a somewhat heavy and complex one to carry out in practice. In addition, the connecting strips have a complicated form.

DISCUSSION OF THE INVENTION

An object of the invention is to provide a wiper drive unit which is easier to make, and in which the connecting strips are of simpler form.

According to the invention, a drive unit for a motor vehicle screen wiper, comprising a motor, a reduction gearbox, an electrical connector, a gearbox body, a closure plate adapted to be fixed to the gearbox body, and electrically conductive strips associated with the closure plate and arranged to provide electrical connections between the motor, the gearbox and the connector, is characterised in that the drive unit further includes a cover which is adapted to be fixed to one face of the closure plate, with the said conductive strips being interposed between the said face of the closure plate and the cover, the closure plate and cover being so configured as together to define a closed housing containing the said conductive strips.

In this way, insulation of the middle parts of the connecting strips is obtained by simple assembly of the closure plate with the cover. The connecting strips are protected from corrosion and short circuits within their housing. This drive unit is therefore simple to make. The connecting strips interposed between the cover and closure plate can be made in a simple form.

Preferably, the closure plate has a first through orifice, and the cover has a second through orifice, the closure plate and the cover being so configured that the said through orifices together define a labyrinth vent. The forming of this vent is very easy, due to the fact that the vent is in two parts, one in the cover and one in the closure plate.

Preferably, the closure plate and the cover include means for retaining the said connecting strips in position. In this way the connecting strips are secured in position simply by assembling them together with the closure plate and the cover. It is no longer necessary to carry out any upsetting or soldering steps.

Preferably, the connecting strips include first strip portions extending within the connector to define connecting pins thereof. By virtue of this feature the number of components that require to be made and assembled together to form the drive unit is reduced.

Preferably, the connecting strips are bent to a configuration in which the said first strip portions that define the connecting pins have faces which lie facing towards each other and disposed at right angles to a general plane of the closure plate, and in which each connecting strip includes at least one further strip portion, the said further strip portions all being in a common plane parallel to the general plane of the closure plate. The connecting strips are therefore arranged in a particularly compact way, and they are in a form which is simple to make.

Preferably, the closure plate has a through hole, the connecting strips including end sections extending through this hole and constituting wiping contacts for engagement against a movable member of the gearbox, the cover including lugs projecting from an internal face of the cover and arranged to bear against the wiping contacts. In this way the cover helps to ensure good contact of the wiping contacts with the moving contact member of the gearbox.

The closure plate and the cover preferably include fastening means for clipping the cover and the closure plate together.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 3 is a perspective view showing the internal face of the same closure plate.

FIG. 4 is a plan view of the external face of the closure plate.

FIG. 5 is a perspective view showing the external face of the cover.

FIG. 6 is a perspective view showing the internal face of the cover.

FIG. 7 is a plan view of the internal face of the cover.

FIG. 8 is a plan view of the connecting strips.

FIG. 9 is a side view of a portion of a connecting strip which constitutes a wiping contact.

FIG. 10 is a side view of a portion of a connecting strip which constitutes a terminal for connection of the motor of the drive unit.

FIG. 11 is a side view of a U-shaped portion of a connecting strip.

FIG. 12 is a circuit diagram for the electrical circuit of the vehicle for power supply and control of the wiper drive unit.

FIG. 13 is a detail view in cross section of the closure plate and the cover, showing the labyrinth vent.

DESCRIPTION OF A PREFERRED EMBODIMENT OF THE INVENTION

Figure 1:
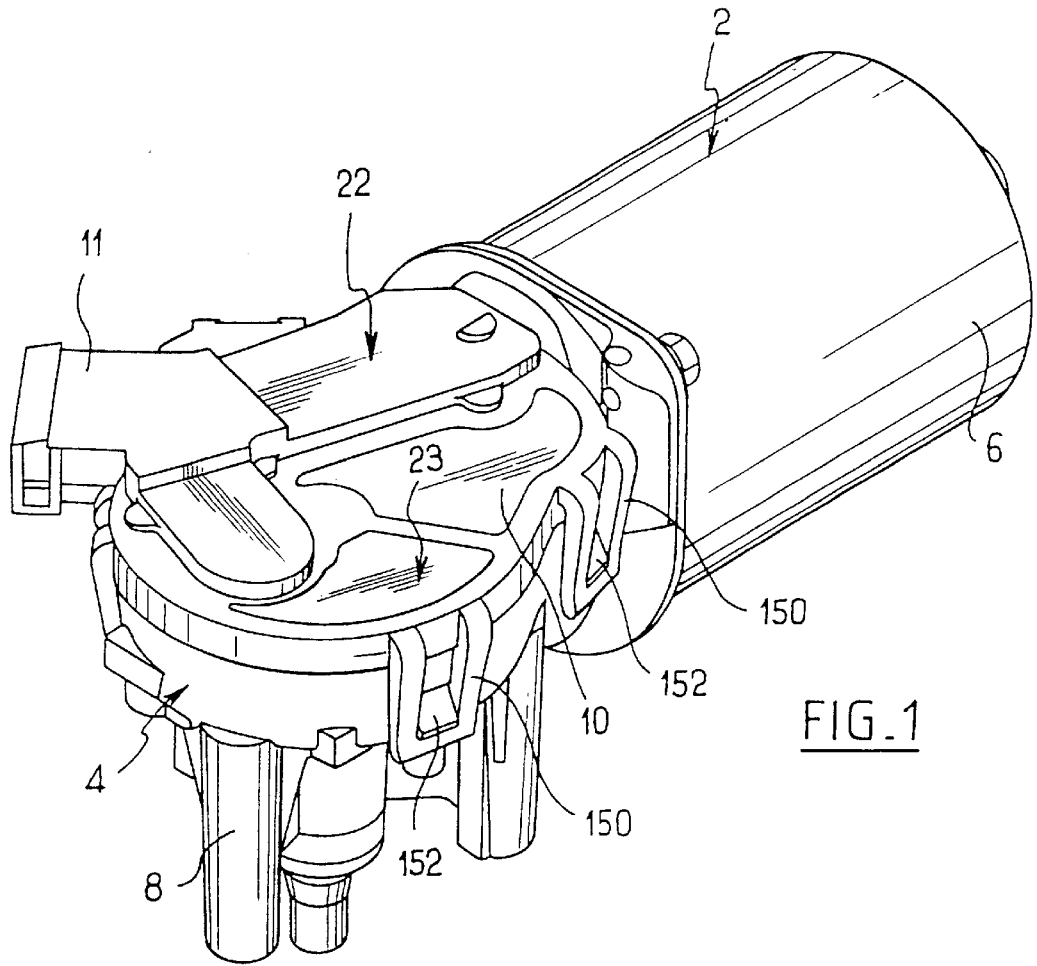
FIG. 1 is a perspective view of a wiper drive unit according to the invention.

Reference is first made to FIG. 1, showing a wiper drive unit according to the invention for a motor vehicle screen wiper, the drive unit being a motorised reduction gear unit comprising a motor 2 and a reduction gearbox 4. The motor 2 has a generally cylindrical casing 6, while the reduction gearbox 4 includes a metal gearbox body 8 which is open on one side and which includes a base portion and a side edge. The reduction gearbox 4 also includes a closure plate 10 of generally flat form, made in plastics material and adapted to be fixed to the gearbox body 8, so as to close off the latter on the open side of the latter. The wiper drive unit also includes a connector 11 for connecting the drive unit to the electric wiring harness of the vehicle, and five metal conductive connecting strips 12, 14, 16, 18 and 20 which are best shown in FIG. 8. These connecting strips connect electrically together the motor 2, the reduction gear unit 4, and the connector 11.

The reduction gear unit 4 further includes a cover 22 which is arranged to be secured to an external face 23 of the closure plate 10, with the connecting strips being interposed between the external face 23 and the cover 22. The closure plate 10 and the cover 22 are so configured as to define together a closed housing containing the connecting strips, as will be explained in detail later herein.

With reference to FIG. 8, the connecting strips are formed by stamping from sheet metal, followed by bending and a curving operation. The strip 12 has a generally Y-shaped form in plan view, consisting of three branches or strip portions which are joined together at a common point. The other connecting strips 14, 16, 18 and 20 have a generally bent form in plan view, so that each of these other strips consists of two branches or strip portions.

More precisely, each of the connecting strips 12, 14 and 16 hasa strip portion 32, 34 and 36 respectively. The faces of these strip portions 32, 34 and 36, which are substantially straight, are substantially coplanar with each other, and these strip portions extend parallel to each other in a common direction. With reference to FIG. 10, each of these strip portions 32, 34, 36 terminates in an end section 37, which is bent back at an angle to the plane of the corresponding strip portion 32, 34 or 36 itself. The end of each of these end sections 37 is bent back in the form of a hook. The portion 32 of the connecting strip 12 is shorter than the corresponding portions 34 and 36 of the strips 14 and 1 6 respectively, and the strip portions 34 and 36 are of the same length as each other. The end section 37 of the portion 32 of the strip 12 acts as an earth, or ground, terminal, and is arranged to make contact with the wall of the gearbox body 8 on an internal face of the edge of the body 8 within the reduction gearbox. The end sections 37 of the portions 34 and 36 of the connecting strips 14 and 16 respectively are connecting terminals for the motor 2, being arranged to make contact with conductors which are connected to a brush carrier plate (not shown) of the motor.

The connecting strips 12, 18 and 20 have further strip portions 42, 48 and 50 respectively, which are bent in plan view, and which have their faces coplanar with each other and with the strip portions 32, 34 and 36. In plan view, the end sections 47 of these strip portions 42, 48, 50 are substantially straight and extend parallel to each other in a common direction. With reference to FIG. 9, these end sections 47 are configured with four bends, formed by bending the strip alternately in different directions, the end sections 47 all lying on the same side of the plane in which the main part of the strip portions 42, 48 and 50 lie. The free end of each end section 47 is formed with a pip on its surface nearest the outside, i.e. the surface furthest away from the plane of the main part of the strip portions 42, 48 and 50. The end sections 46 are thus designed so as to act as wiping contacts, which are arranged to engage against a movable member of the reduction gearbox 4, such as a wheel, not shown, carrying conductive tracks or slip rings, with which the wiping contacts thereby make direct contact.

The strip portions 34 and 36, and the strip portions 48 and 50, of the connecting strips 14, 16 and 18, 20 respectively, all lie on the same side of the Y-shaped connecting strip 12 as shown in FIG. 8. The strip portion 34 is between the strip portions 32 and 36, while the strip portion 48 is between the strip portions 42 and 50. With the exception of their end sections 47 and 37 that constitute wiping contacts and connecting terminals respectively as described above, the strip portions 32, 24, 36, 42, 48 and 50 lie in a common plane which is parallel to the general plane of the closure plate 10 before assembly.

The connecting strips 12, 14, 16, 18 and 20 also include further strip portions 62, 64, 66, 68, and 70 respectively. In this connection, the five elements 62, 64, 66, 68, 70 will be referred to as first strip portions, the three elements 42, 48, 50 as second strip portions, and the three elements 32, 34, 36 as third strip portions.

Each of the first strip portions is joined to the remainder of the connecting strip concerned through a bend, so that the first strip portions are parallel to each other, and so disposed that their faces lie facing each other at right angles to the above mentioned common plane containing the second and third strip portions 32, 34, 36, 42, 48, 50, so that the first strip portions 62, 64, 68, 66, 70 together form in a comb-like configuration as shown in FIG. 8, all extending in a common direction. With reference to FIG. 11, each of the four first strip portions 64, 68, 66 and 70 of the strips 14, 18, 16 and 20 respectively has an intermediate cranked portion 51 in the form of an inverted U, which comprises a base or spine and two branches. Each of these cranked portions 51 bridges certain of the other connecting strips so as to avoid electrical contact with these latter. The end sections of the five first strip portions are bent back on themselves so as to double their thickness, as is clearly shown in FIG. 8. These end sections are designed to extend into the connector 11 (FIG. 1) so as to constitute connecting pins of the connector.

It can therefore be seen that, in the Y-shaped connecting strip 12, one of its branches comprises the strip portion 32 for making contact with the body of the reduction gearbox, another branch includes one of the wiping contacts 47, and a further branch includes one of the pins of the connector 11.

Figure 2:
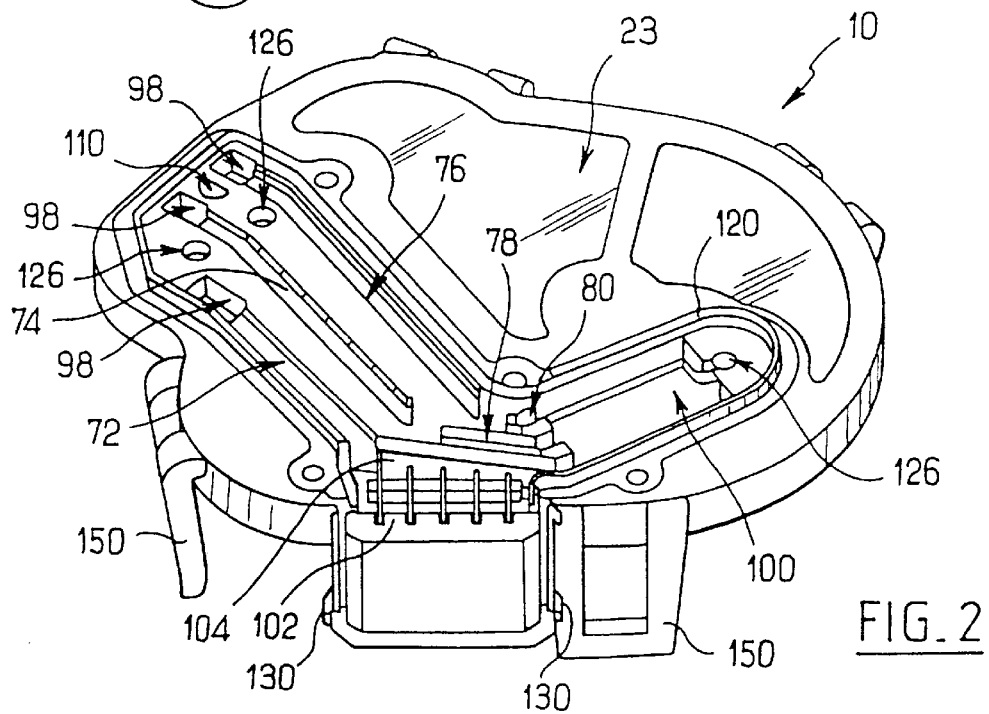
FIG. 2 is a perspective view showing the external face of the closure plate of the drive unit of FIG. 1.

Reference is now made to FIGS. 2 to 4. The closure plate 10 has a generally rounded shape in plan view, corresponding to that of the edge of the gearbox body 8. The closure plate 10 has five grooves 72, 74, 76, 78 and 80 on its external face 23. In plan view, the profile of these grooves is matched to the plan shape, described above, of the coplanar second and third connecting strip portions 32, 42, 34, 36, 48 and 50 respectively, so as to receive these various strip portions, with one side of each strip portion lying flat in the base of the corresponding groove. The groove 72 is generally Y-shaped in plan.

With reference now to FIGS. 5 to 7, the cover plate 22 is generally flat, and has in plan view a form enveloping the contour of the connecting strips. The cover plate has an internal face 83 which is adapted to lie facing the external face 23 of the closure plate 10. Three ribs 92, 94 and 96 are formed in the internal face 83. In plan view the three ribs 92, 94 and 96 have a form which is symmetrical to that of the grooves 72, 74 and 76 respectively. These ribs are disposed in such a way as to engage against the surface, facing towards the cover, of the connecting strip portions 32, 34 and 36 that lie in the grooves 72, 74 and 76 respectively. Thus, after the closure plate 10, the various connecting strips and the cover 22 have been assembled together, these grooves and ribs together constitute means retaining the connecting strips 12, 14 and 16 in position, with the ribs holding the connecting strips against the base of the grooves.

At one end of the grooves 72, 74 and 76, corresponding to the terminal portions or end sections 37 of the connecting strips 12, 14 and 16 respectively, the closure plate 10 has three respective holes 98 formed through the thickness of the closure plate. The terminal portions 37 extend through these holes.

In line with the wiping contact portions 47 of the connecting strips 12, 18 and 20, the closure plate 10 has a generally rectangular hole 100 formed through the thickness of the closure plate. The wiping contacts 47 themselves extend through this hole 100, so as to be able to engage against the movable member of the gearbox mentioned above. The cover 22 has three lugs 95, 97 and 99, which project from the internal face of the cover and which are so disposed that they can each bear against the base of a respective one of the wiping contacts. These lugs hold the base of each corresponding wiping contact in contact with the closure plate 10 at the edge of the hole 100, against the mechanical reaction force exerted on the wiping contacts by the movable member of the gearbox when the latter is engaged by the wiping contacts.

The connector 11 is partly defined by the cover 22 and partly by the closure plate 10, each of these components 22 or 10 defining a flat surface of the connector 11 and one half of its side faces.

The closure plate 10 includes a first closure plate comb 102 adjacent to the connector 11, as shown in FIGS. 2 and 4. The comb 104 projects from the outer face of the closure plate and is formed with five notches which receive the first strip portions 62, 64, 68, 66 and 70 (FIG. 8) of the connecting strips, behind the doubled-over end sections of the latter that define the connecting pins described above. The comb 102 is so configured that the lower edge of each first strip portion bears against the base of the corresponding notch. The closure plate also includes a second closure plate comb 104 which is spaced away from the connector 11. The comb 104 projects from the external face of the closure plate, and has five blind notches in which the strip portions 62, 64, 66, 68 and 70 are received in the region of one end of the U-shaped branch close to the connector.

As shown in FIGS. 6 and 7, the cover 22 includes a first cover comb 106, adjacent to the connector and constituting an internal base surface of the connector. This comb 106 projects from the internal face of the cover 22, and has five notches in which the first strip portions 62, 64, 66, 68 and 70 of the connecting strips are received behind the doubled-over portions which define the connecting pins. The comb 106 is so configured that the upper edge of each of these strip portions bears against the base of the corresponding notch. The cover 22 also includes a second cover comb 108 spaced away from the connector 11. This comb 108 projects from the internal face of the cover, and has five notches. The base of each U-shaped portion 51 of the first strip portions 62, 64, 66, 68 and 70 is received in a respective one of these notches. The outer edges of the bases of the U-shaped portions 51 are coplanar, and bear against the cover 22 at the base of these notches. After assembly, the various combs lie in a succession which is as follows, going from the connector 11: first cover comb 106, first closure plate comb 102, second cover comb 108, and second closure plate comb 104. The various combs also constitute means for retaining the connecting strips in position between the closure plate and the cover.

With reference now to FIG. 13, the closure plate 10 is formed with a first through orifice 156, comprising two cavities 110 and 154 which are located between the two holes 98, and which extend from the external face and the internal face respectively of the closure plate. Only one of these cavities can be seen in FIGS. 2 and 4, namely the cavity 110. These two cavities are offset from each other and are joined together, as shown in FIG. 11, through a transverse passage which lies in a plane at right angles to the general plane of the closure plate. The orifice 156 thus forms a chicane. As shown in FIGS. 1, 5, 7 and 13, the cover has a relief or raised element 112, which projects from the external face of the cover. One side face of this raised element is open so as to define an outer portion of a second through orifice 114 that lies in a plane parallel to the general plane of the cover 22. The orifice 114 is L-shaped in cross section here, its outer portion being extended by an inner portion, in register with the cavity 110 and extending at right angles to the general plane of the cover. The two orifices 114 and 156 have a width of the order of a few tens of millimetres.

The orifice 156 or chicane, and the orifice 114, together constitute a labyrinth vent, for ventilating the motor 2 of the drive unit while limiting ingress of water into the motor by projection of water from outside.

With reference to FIG. 3, the closure plate 10 includes a skirt element 116 which extends from the internal face of the closure plate at right angles to the plane of the latter. The skirt element 116 has the form, in plan, of a U open towards the motor 2. This skirt element insulates from the reduction gearbox the end sections 37, or terminals, of the connecting strips 14 and 16 and the ventilating vent.

The closure plate has a lip 120, FIGS. 2 and 4, which envelops the emplacement of the connecting strips and which projects from the outer face 23 of the closure plate. The cover 22 has a peripheral rim 122, FIGS. 6 and 7, which projects from the internal face of the cover. The lip 120 and the rim 122 are so configured as to be contiguous through their side faces when the cover is fixed on the closure plate.

The closure plate and the cover also include fastening means, for securing them together by clipping the cover on to the closure plate. These clipping means comprise three pairs of fingers 124, FIGS. 6 and 7, carried by the cover 22 and projecting from its internal face, the fingers of each pair being elastically displaceable towards each other and having an external bead on their opposed outer faces. Each pair of fingers 124 is arranged to be introduced into a hole 126, FIGS. 2 to 4, formed through the closure plate 10. There are two of these holes 126, located close to the convex, or inwardly facing, surface of the skirt element 116 as shown in FIG. 3. A third hole 126 is formed at one end of the hole 100. The above mentioned clipping means also include, on the cover 4 and bridging both halves of the connector 11, two side lugs 128, each formed with an opening, together with nose elements 130, FIG. 3, which are carried by the closure plate 10 and which are arranged to fit within the openings in the lugs 128.

The cover 22 carries six centring pegs 132, FIG. 7, which project from its internal face and which are arranged to be inserted in holes formed in the external face of the closure plate, for the purpose of locating the cover and the closure plate with respect to each other during assembly.

The closure plate 10 and the cover 22 could, either in addition or alternatively, be adhesively bonded to each other. They could also be welded together by ultrasonic welding. Such adhesive bonding or welding results in the housing being sealed at the junction between the closure plate and the cover.

After the closure plate, connecting strips and cover have been assembled together, the closure plate 10 is secured to the gearbox body 8. For this purpose, the closure plate carries clipping lugs 150, each formed with a through opening like the clipping lugs 128 described above, and similarly, the gearbox body 8 is formed with nose elements 152 over which the clipping lugs 150 are secured.

Reference is now made to FIG. 12, in order to describe briefly the electric circuit of the wiper drive unit, with a view in particular to describing the connections of the connecting strips described earlier herein with reference to FIG. 8. It will of course be understood that the principle of this circuit per se is conventional. The control switch for the wiper drive unit, actuated by the driver of the vehicle, is indicated by the reference numeral 134. The connector 11 and the drive unit itself are indicated in FIG. 12 by broken lines.

The driver's control switch 134 includes, in the lower conduct short lower conductive plate, a long lower conductive plate connected to a positive potential, a long upper conductive plate, and a short upper conductive plate. It also includes a control member which can be put into three positions, so as to connect together certain of the conductive plates of the switch. In the stop position 1, the movable member is in contact with the short lower conductive plate and the long upper conductive plate. In the low speed position 2, it is in contact with the long lower conductive plate and the long upper conductive plate. In the high speed position 3, the movable member is in contact with the short upper conductive plate and the long lower conductive plate. In the well known way, the wiper drive unit includes an auxiliary interrupter for starting the screen wiper blade in the lowest wiping position of the latter, this auxiliary interrupter consisting of conductive tracks of the wheel in the gearbox 4, described earlier herein, and the wiping contacts in contact with these tracks.

The connections of the conductive strips carried between the cover 22 and the closure plate 10 with the driver's control switch 134 are made via the connector 11 and a plug of the vehicle wiring which is received in the connector 11. As shown in FIG. 12, the connecting strip 12 is connected to the conductive tracks of the above mentioned wheel and to earth (ground). The conductive strip 14 is connected to the low speed terminal of the motor 2, and to the long upper conductive plate, or ramp, of the switch 134. The conductive strip 16 is connected to the high speed terminal of the motor 2, and to the short upper conductive strip, or ramp, of the switch 134. The conductive strip 18 is connected to the conductive tracks of the wheel and to the short lower conductive plate, or ramp, of the switch 134. Finally, the conductive strip 20 is connected to the tracks of the wheel and to the long lower conductive plate, or ramp, of the switch 134.

The conductive strips of the wiper drive unit are fixed in place by simply locating them in position and fastening the cover 22 on to the closure plate 10. It is not necessary to carry out any welding or upsetting operations in this connection.

The conductors of the motor 2 that make contact with the two end sections 37 of the conductive strips which constitute connecting terminals for the motor, may be carried by a connecting member extending through an aperture in a partition of the gearbox body 8 that separates the motor 2 from the gearbox 4. This connecting member will comprise a duct which is open facing towards the vent of FIG. 13 and communicating with the interior of the motor.

Numerous other modifications can of course be applied to the embodiment of the invention described above, without departing from the scope of the invention. The retaining grooves for the connecting strips can be formed in the cover 22, the corresponding ribs then being carried by the closure plate 10. The vent may include a membrane of a material impermeable to water but permeable to gas, and placed for example so that it closes off one of the orifices 114 or 156.

The invention is also applicable to a wiper drive unit in which the motor is an electrical entity separate from the gearbox body. In that case, a supplementary hole will be provided in the closure plate to enable the terminal portion 37 of the Y-shaped connecting strip 12 to be passed through it for connection to ground.

What is claimed is:

1. A motor vehicle screen wiper drive unit comprising: a motor; a reduction gearbox coupled to the motor; the gearbox including a gearbox body an electrical connector on the gearbox for making external electrical connections; a closure plate being secured on the gearbox body; electrically conductive connecting strips for electrically connecting the motor, the gearbox and the connector; and a cover fastened to a face of the closure plate, the closure plate and the cover defining a closed housing containing the connecting strips, wherein the connecting strips are interposed between the face of the closure plate and the cover.

2. A drive unit according to claim 1, wherein the closure plate has an external face and an internal face, the cover being fixed to the external face of the closure plate.

3. A motor vehicle screen wiper drive unit comprising: a motor; a reduction gearbox coupled to the motor; the gearbox including a gearbox body and an electrical connector on the gearbox for making external electrical connections; a closure plate being secured on the gearbox body; electrically conductive connecting strips for electrically connecting the motor, the gearbox and the connector; and a cover fastened to a face of the closure plate, the closure plate and the cover defining a closed housing containing the connecting strips, wherein the connecting strips are interposed between the face of the closure plate and the cover and wherein the closure plate has a first through orifice and the cover has a second through orifice, and wherein the first and the second through orifices cooperate with each other to define a labyrinth vent.

4. A drive unit according to claim 3, wherein the cover has an external face and an internal face and defines a general plane of the cover, the cover including a raised element projecting from its external face, a portion of the second through orifice being formed through the raised element and a portion of the second through orifice extending in a plane at right angles to the general plane.

5. A drive unit according to claim 3, wherein the closure plate defines a general plane of the closure plate; and wherein two cavities are formed within the closure plate, the cavities defining the first through orifice and constituting a chicane partly extending in a direction at right angles to the general plane of the closure plate.

6. A motor vehicle screen wiper drive unit comprising: a motor; a reduction gearbox coupled to the motor; the gearbox including a gearbox body and an electrical connector on the gearbox for making external electrical connections; a closure plate being secured on the gearbox body; electrically conductive connecting strips for electrically connecting the motor, the gearbox and the connector; and a cover fastened to a face of the closure plate, the closure plate and the cover defining a closed housing containing the connecting strips, wherein the connecting strips are interposed between the face of the closure plate and the cover and wherein the closure plate and the cover each include retaining means for retaining the connecting strips in position.

7. A drive unit according to claim 6, wherein the closure plate has a plurality of grooves for receiving the connecting strips, and wherein the cover has a plurality of ribs for bearing against a surface of the connecting strips, the grooves and the ribs constituting the retaining means.

8. A motor vehicle screen wiper drive unit comprising: a motor; a reduction gearbox coupled to the motor; the gearbox including a gearbox body and an electrical connector on the gearbox for making external electrical connections; a closure plate being secured on the gearbox body; electrically conductive connecting strips for electrically connecting the motor, the gearbox and the connector; and a cover fastened to a face of the closure plate, the closure plate and the cover defining a closed housing containing the connecting strips, wherein the connecting strips are interposed between the face of the closure plate and the cover and wherein each of the connecting strips includes a first strip portion extending into the connection for defining a connecting pin.

9. A drive unit according to claim 8, wherein each of the first strip portions has an end section bent back on itself for doubling the thickness of the first strip portion.

10. A drive unit according to claim 8, wherein the cover plate defines a general plane of the closure plate, each of the connecting strips comprising at least one second strip portion, all of said second strip portions lying in a common plane, said common plane being parallel to the general plane of the closure plate, each of the connecting strips having a bent portion joining said first strip portion to at least one second strip portion, each first strip portion having a surface facing a corresponding surface of an adjacent first strip portion, the surfaces of the first strip portions being disposed at right angles to the general plane of the closure plate.

11. A drive unit according to claim 8, wherein one component selected from the group consisting of the closure plate and the the closed housing includes a component having a comb adjacent to the connector, the component having an internal face, the comb projecting from the internal face and including notches for receiving the first strip portions.

12. A drive unit according to claim 11, wherein each notch has a base and the first strip portion of each connecting strip has an edge and wherein the edges abut on the bases.

13. A drive unit according to claim 8, wherein the first strip portion in some of the connecting strips includes a zone in the form of an inverted U bridging at least one other of the connecting strips.

14. A drive unit according to claim 13, wherein each of said zones in the form of an inverted U has a base portion defining an external edge, the external edges being coplanar and bearing against the cover.

15. A motor vehicle screen wiper drive unit comprising: a motor; a reduction gearbox coupled to the motor; the gearbox including a gearbox body an electrical connector on the gearbox for making external electrical connections; a closure plate being secured on the gearbox body; electrically conductive connecting strips for electrically connecting the motor, the gearbox and the connector; and a cover fastened to a face of the closure plate, the closure plate and the cover defining a closed housing containing the connecting strips, wherein the connecting strips are interposed between the face of the closure plate and the cover and wherein the gearbox includes a movable electrical contact member, each of some of the connecting strips having a wiping contact end section, the closure plate having a first through hole, the end sections extending through the first through hole for engaging the wiping contacts with the movable member of the gearbox, the cover having an internal face and a plurality of lugs, the lugs projecting from said internal face for engagement against the wiping contacts.

16. A motor vehicle screen wiper drive unit comprising: a motor; a reduction gearbox coupled to the motor; the gearbox including a gearbox body an electrical connector on the gearbox for making external electrical connections; a closure plate being secured on the gearbox body; electrically conductive connecting strips for electrically connecting the motor, the gearbox and the connector; and a cover fastened to a face of the closure plate, the closure plate and the cover defining a closed housing containing the connecting strips, wherein the connecting strips are interposed between the face of the closure plate and the cover and wherein one of the connecting strips has an electrical contact end section for making the electrical contact with the gearbox body, the gearbox body being formed of metal and the closure plate being formed with a second through hole, the end section extending through the second through hole.

17. A drive unit according to claim 1, wherein the closure plate includes first fastening means and the cover includes second fastening means, said first and second fastening means cooperating to secure the closure plate to the cover.

18. A driver unit according to claim 6, wherein the cover has a plurality of grooves for receiving the connecting strips and wherein the closure plate has a plurality of ribs for bearing against a surface of the connecting strips, the grooves and the ribs constituting the retaining means.

* * * * *